United States Patent
Lim

(10) Patent No.: US 10,213,801 B2
(45) Date of Patent: *Feb. 26, 2019

(54) SYSTEM AND METHOD FOR SPRAY PAINTING EXTERNAL WALLS OF BUILDING

(71) Applicant: Elid Technology International Pte Ltd, Singapore (SG)

(72) Inventor: Hui Eng Lim, Singapore (SG)

(73) Assignee: Elid Technology International Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,260

(22) Filed: Mar. 28, 2017

(65) Prior Publication Data
US 2017/0282202 A1 Oct. 5, 2017

(30) Foreign Application Priority Data
Mar. 29, 2016 (SG) .......................... 10201602461W

(51) Int. Cl.
*B05B 13/04* (2006.01)
*B05B 12/12* (2006.01)
(Continued)

(52) U.S. Cl.
CPC .......... *B05B 13/0431* (2013.01); *B05B 12/16* (2018.02); *B05B 13/005* (2013.01);
(Continued)

(58) Field of Classification Search
None
See application file for complete search history.

(56) References Cited

U.S. PATENT DOCUMENTS

| 3,347,339 A | 10/1967 | Coole |
| 4,993,913 A * | 2/1991 | Ohtsuki ..................... B25J 5/00 414/729 |

(Continued)

FOREIGN PATENT DOCUMENTS

| CN | 2072560 U | 3/1991 |
| CN | 200978517 | * 11/2007 .............. E04F 21/08 |

(Continued)

OTHER PUBLICATIONS

International Search Report of international application No. PCT/SG2017/050159 completed May 9,2017 and dated May 16,2017 (5 pages).

(Continued)

*Primary Examiner* — Jethro M. Pence
(74) *Attorney, Agent, or Firm* — Pyprus Pte Ltd

(57) ABSTRACT

This solution is for painting the external walls of a building, and adopts a lightweight six axis robotic arm mounted on a mini-gondola hoisted by a pulley system with the controlling motor located within the mini-gondola, while another set of motor located on the pulley system at the roof-top end drives the mini-gondola to traverse laterally on a set of twin-rails on the roof-top of the building. Four vacuum suction cups mounted on the mini-gondola through linear actuator are used to secure the mini-gondola to the wall. Each linear actuator has three ultrasonic distance sensors that measure and manage the distance between the mini-gondola and the wall to be painted. Once the gondola is in position, the robotic arm will be activated to start the painting process.

8 Claims, 1 Drawing Sheet

1) AIRLESS PAINT SPRAYER
2) ROBOTIC ARM
3) ROBOTIC ARM CONTROLLER
4) ONBOARD CONTROLLER
5) INDUSTRIAL PC
6) FACADE PROTECTION WHEEL
7) SUCTION CUP SYSTEM
8) AIR COMPRESSOR
9) MOTOR DRIVEN SYSTEM
10) MINI GONDOLA (1500x690x1150)
11) MOTOR DRIVEN WITH RAIL TRACK SYSTEM
12) WATER WEIGHT

(51) Int. Cl.
| | |
|---|---|
| *B25J 5/02* | (2006.01) |
| *E04G 3/32* | (2006.01) |
| *F16B 47/00* | (2006.01) |
| *B05B 13/02* | (2006.01) |
| *B25J 9/16* | (2006.01) |
| *B25J 11/00* | (2006.01) |
| *B25J 15/00* | (2006.01) |
| *B25J 19/00* | (2006.01) |
| *E04G 3/28* | (2006.01) |
| *B25J 19/02* | (2006.01) |
| *B05B 12/16* | (2018.01) |
| *B05B 13/00* | (2006.01) |

(52) U.S. Cl.
CPC ............ *B05B 13/0278* (2013.01); *B25J 5/02* (2013.01); *B25J 9/1664* (2013.01); *B25J 11/0075* (2013.01); *B25J 15/0019* (2013.01); *B25J 19/002* (2013.01); *B25J 19/023* (2013.01); *E04G 3/28* (2013.01); *E04G 3/32* (2013.01); *B05B 12/124* (2013.01); *E04G 2003/283* (2013.01); *F16B 47/00* (2013.01); *G05B 2219/45013* (2013.01)

(56) References Cited

U.S. PATENT DOCUMENTS 6,234,737 B1 * 5/2001 Young ..................... B25J 5/02
414/277
2011/0130859 A1 * 6/2011 Habisreitinger ........... B25J 5/02
700/112

FOREIGN PATENT DOCUMENTS

| CN | 200978517 Y | | 11/2007 | |
|---|---|---|---|---|
| CN | 204622046 U | | 9/2015 | |
| CN | 204769318 U | | 11/2015 | |
| JP | H07-109831 A | | 4/1995 | |
| JP | 2002-138659 A | | 5/2002 | |
| JP | 2012-101146 A | | 5/2012 | |
| JP | 2015-186800 | * | 10/2015 | ............ B05B 12/00 |
| KR | 10-2008-0036455 | * | 4/2008 | ............ B05B 13/02 |
| KR | 20120113867 A | | 10/2012 | |
| TW | M506692 | * | 8/2015 | ............... B25J 5/00 |

OTHER PUBLICATIONS

Written Opinion of international application No. PCT/SG2017/050159 completed May 11,2017 and dated May 16, 2017 (6 pages).

* cited by examiner

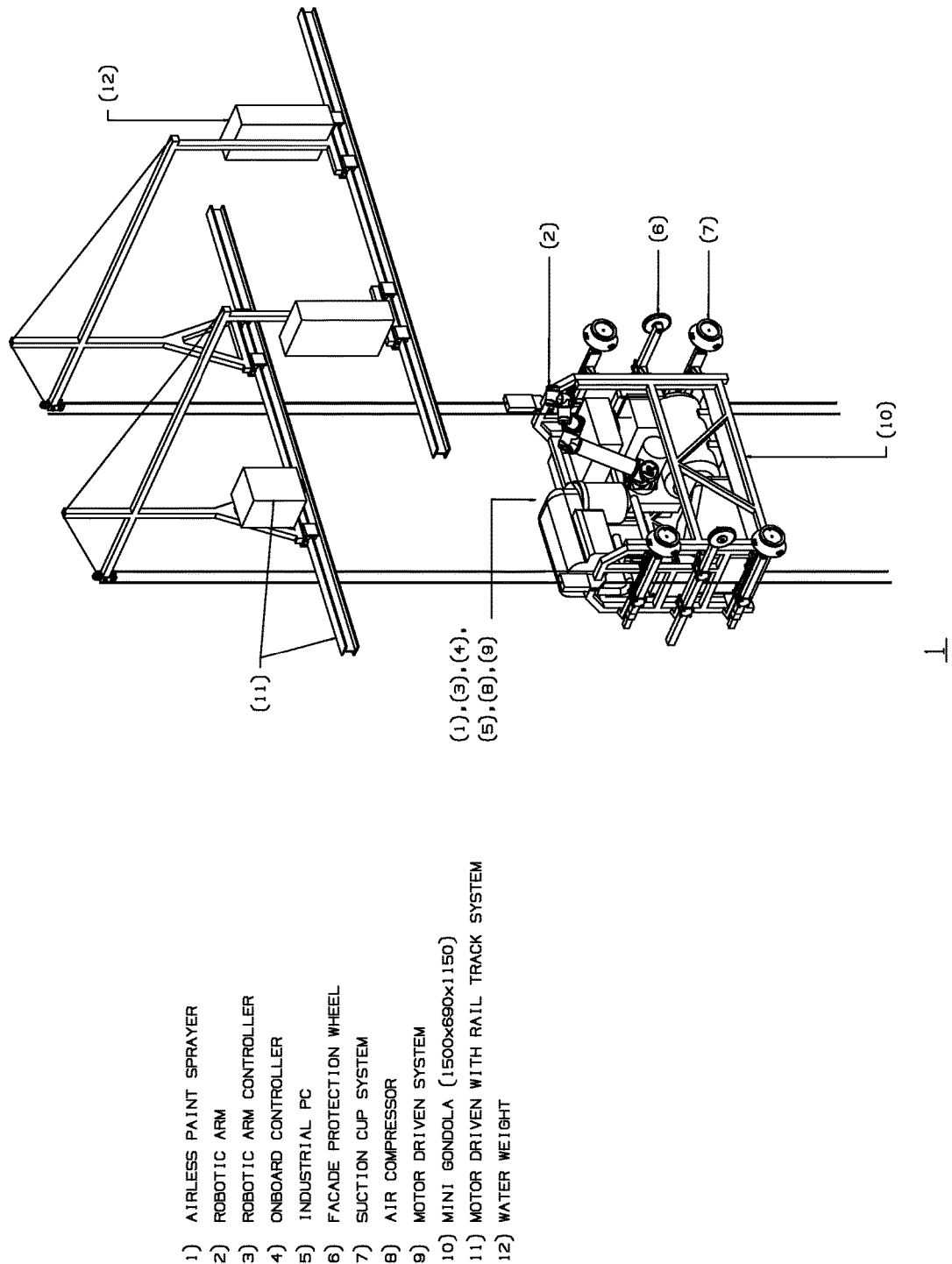
1) AIRLESS PAINT SPRAYER
2) ROBOTIC ARM
3) ROBOTIC ARM CONTROLLER
4) ONBOARD CONTROLLER
5) INDUSTRIAL PC
6) FACADE PROTECTION WHEEL
7) SUCTION CUP SYSTEM
8) AIR COMPRESSOR
9) MOTOR DRIVEN SYSTEM
10) MINI GONDOLA (1500×690×1150)
11) MOTOR DRIVEN WITH RAIL TRACK SYSTEM
12) WATER WEIGHT

SYSTEM AND METHOD FOR SPRAY PAINTING EXTERNAL WALLS OF BUILDING

FIELD OF INVENTION

The present invention relates to a system and method for spray painting, and in particular, a system and method for spray painting the external walls of a building with a lightweight six axis robotic arm coupled with a 3D camera, and a spray nozzle on its end effector; and mounted on a mini-gondola with the mini-gondola hoisted by a motor-drive pulley system traversing along a set of twin-rails located on the roof-top of the building.

SUMMARY

The present invention provides a lightweight six-axis robotic arm, coupled with a 3D camera, and a spray nozzle on its end effector, is seated on a mini-gondola to carry out spraying painting on external walls of a building.

The use of an industrial PC (personal computer) located within the mini-gondola to control a motor-driven pulley system to hoist and lower the mini-gondola to locate the vertical location of the robotic arm (seated on the mini-gondola) for the painting process to be carried out.

The controlling motor of the pulley system that hoists and lowers the mini-gondola in parallel to the external wall of the building to be painted, is located within the mini-gondola.

The mini-gondola hangs on a motor-driven pulley system that traverses along a pair of rails, guiding the mini-gondola/robotic arm to travel along the linear distance (x-axis) for the painting process to be carried out.

The use of four vacuum suction cups mounted respectively on each linear actuator to secure the mini-gondola to the wall when the robotic arm makes a 'stop' for the painting process to be conducted; the suction cups are controlled by an industrial PC (personal computer) located within the mini-gondola.

The use of three ultrasonic distance sensors mounted on each linear actuator on the mini-gondola to measure and manage the distance between the mini-gondola and the wall that is to be painted; the distance measured will then be fed back to an industrial PC (personal computer located on the pulley system that hoists the mini-gondola) which controls the distance between the mini-gondola and the wall to be painted; four vacuum suction cups on the mini-gondola will then be activated to secure the mini-gondola to the wall.

Once the mini-gondola is 'secured' to the wall, a 3D camera mounted on the robotic arm will be activated to scan the wall area to be painted; a software program will calculate the trajectory path of the paint spraying motion for the robotic-arm to carrying out the paint spraying action.

The use of a collection hood covering over the paint spray nozzle to collect any paint debris and paint fallouts during the paint spraying process.

The use of a pair of facade protection wheel (6) on the mini-gondola to cushion any impact of the mini-gondola made on the facade of the wall to be painted.

The use of an Industrial PC (personal computer) to control a controller located on the roof-top to monitor the paint level within the paint container to ensure that paint availability is maintained.

The use of water weight for counter balancing on the motor-driven pulley system.

BRIEF DESCRIPTION OF DRAWING

FIG. 1 illustrates a system in accordance with an embodiment of the present invention.

DESCRIPTION

FIG. 1 illustrates a mini-gondola in accordance with an embodiment of the present invention. A lightweight six-axis robotic arm (2) is adopted to paint external walls of a building with a paint spray nozzle (1) mounted on the robotic arm's end-effector to spray the paint onto the walls. The robotic arm is mounted on a mini-gondola (10) and hoisted by a pulley system with the controlling motor located (9) within the mini-gondola, while another set of motor located on the pulley system (11) at the roof-top end drives the mini-gondola to traverse laterally on a set of twin-rails on the roof-top of the building. The pulley system raises and lowers the mini-gondola in parallel to the external wall of the building to be painted, spray painting the wall in a vertical manner from top to bottom, column by column.

1. The Lightweight Six-Axis Robotic Arm (2)

The six-axis robotic arm is to be lightweight, and is coupled with a 3D camera and a spray nozzle (airless paint sprayer) on its end effector. The 3D camera mounted on the robotic arm scans the wall area (approximately 1.2 m by 1.2 m) to be painted; a software program will then calculate the trajectory of the paint spraying motion for the robotic-arm to carrying out the paint spraying action.

The robotic arm is controlled (through a RS422 cable, TCP/IP) by an industrial PC (personal computer) (5) mounted within the mini-gondola.

2. Adoption of Mini-Gondola (10)

A specially designed mini-gondola, hoisted by a motor-driven pulley system with the controlling motor of the pulley system within the mini-gondola, is used to seat/house the robotic arm to carry out the painting of the external wall of a building. Four vacuum suction cups (7) mounted on the mini-gondola helps to secure the mini-gondola to the wall when the mini-gondola/robotic arm makes a 'stop' for the painting process to be conducted. To have further securing of the mini-gondola—prevention of swaying motion—a tow line attached to the mini-gondola is used to secure the mini-gondola to the ground.

An onboard controller (4) mounted on the mini-gondola manages and controls the distance between the mini-gondola and the wall to be painted. The measured distance is fed from the onboard controller to the Industrial PC (personal computer located within the mini-gondola), which then activates the robotic arm to start the painting process.

3. Motor-Driven Pulley System with Controlling Motor within the Mini-Gondola, and Industrial PC for Roof-Top Controller The controlling motor (9) of the pulley system that hoists and lowers the mini-gondola in parallel to the external wall of the building to be painted is located within the mini-gondola. An Industrial PC (personal computer) located within the mini-gondola controls this controlling motor, hoisting and lowering the mini-gondola in the vertical height position (y-axis) to locate the position of the robotic arm (seated on the mini-gondola) for the painting process to be carried out. The Industrial PC also controls another motor (11) that drives the mini-gondola to travel along the linear distance (x-axis), traversing along a set of twin-rails located on the roof-top of the building.

Water weight (12) is used to counter balance the pulley system on the twin-rails.

4. The Control (Monitoring of Paint Container Level) and Discharge of the Paint Sprayed from the Nozzle.

The paint will be sprayed onto the wall with an airless paint sprayer mounted on the end-effector of the robotic arm. A collection hood covering over the paint spray nozzle is used to collect any paint debris and paint fallout during the paint spraying process. An Industrial PC (personal computer) is used to monitor the paint level within the paint container to ensure that paint availability is maintained.

5. The Building Facade Painting Sequence

The painting sequence will be from left of the building and moving towards the right as the motor-driven pulley system transverses itself in that direction. The spray painting on the wall will be in a vertical manner from top to bottom, column by column; once each column is being painted, the motor-driven pulley system will traverse to the right and make another 'stop' to paint the next following column.

6. Ground Controller

Through RS422 or RS485 (long distance serial communication), the industrial PC is also controlled by a remote electronic controller to allow the control of the motor-driven pulley system at the ground level.

The invention claimed is:

1. A spray painting system for spray painting external walls of building, the system comprising:
   a gondola for hanging on a motor driven pulley system, wherein the motor driven pulley system comprises a pair of rails and a set of motors located at roof-top end of the pulley system; wherein the pair of rails are disposed in a horizontal plane on the roof-top, and the hanging gondola is disposed in a vertical plane in parallel to an external wall; thereby, when the set of motors drives the pulley system along the pair of rails in the horizontal plane, the gondola operationally traverses in the vertical plane along the pair of rails along a linear distance of the rails for a painting process to be carried out; wherein the gondola comprises a controlling motor of the pulley system that hoists and lowers the gondola in parallel to the external wall of the building to be painted, wherein the controlling motor is located within the gondola;
   a six-axis robotic arm, coupled with a 3D camera, and a spray nozzle on its end effector, the six-axis robotic arm is seated on the gondola for carrying out spray painting on the external walls;
   wherein the 3D camera mounted on the robotic arm operationally scans a wall area to be painted; and
   a software program adapted for receiving the scanned results from the 3D camera and calculating the trajectory path of the spray painting's motion for the robotic arm.

2. The system according to claim 1, further comprising a counter weight for counter balancing on the motor-driven pulley system.

3. The system according to claim 1, further comprising a collection hood covering over the paint spray nozzle to collect any paint debris and paint fallouts during the spray painting process.

4. The system according to claim 1, wherein the gondola further comprises a pair of facade projection wheels adapted for cushioning impact of the gondola made on the facade of the wall to be painted.

5. The system according to claim 1, further comprises an industrial PC (personal computer), the industrial PC is adapted for controlling the motor-driven pulley system to hoist and lower the gondola to locate the vertical location of the six-axis robotic arm.

6. The system according to claim 5, further comprising:
   four vacuum suction cups mounted respectively on linear actuators to secure the gondola to the wall when the robotic arm makes a stop for the painting process to be conducted; the suction cups are controlled by the industrial PC (personal computer) located within the gondola.

7. The system according to claim 5, wherein the industrial PC is adapted to control a controller located on a roof-top of the building to monitor a paint level within a paint container to ensure the paint availability is maintained.

8. The system according to claim 1, further comprising:
   three ultrasonic distance sensors mourned on linear actuators on the gondola to measure the distance between the gondola and the wall that is to be painted; wherein the distance measured is fed back to control the distance between the gondola and the wall to be painted.

* * * * *